US012585475B2

(12) United States Patent
Anders et al.

(10) Patent No.: US 12,585,475 B2
(45) Date of Patent: Mar. 24, 2026

(54) AUTOMATED BOOT IMAGE CONFIGURATION AND BOOTING VIA A BASEBOARD MANAGEMENT CONTROLLER IN RESPONSE TO AN UNSOLICITED BOOT IMAGE

(71) Applicant: Red Hat, Inc., Raleigh, NC (US)

(72) Inventors: Jacob Anders, Cairns (AU); Dmitry Tantsur, Düsseldorf (DE)

(73) Assignee: Red Hat, LLC, Raleigh, NC (US)

( * ) Notice: Subject to any disclaimer, the term of this patent is extended or adjusted under 35 U.S.C. 154(b) by 0 days.

(21) Appl. No.: 18/344,377

(22) Filed: Jun. 29, 2023

(65) Prior Publication Data

US 2025/0004788 A1 Jan. 2, 2025

(51) Int. Cl.
G06F 9/4401 (2018.01)

(52) U.S. Cl.
CPC .................................. G06F 9/4416 (2013.01)

(58) Field of Classification Search
CPC ...................................................... G06F 9/4416
See application file for complete search history.

(56) References Cited

U.S. PATENT DOCUMENTS

| | | | | | |
|---|---|---|---|---|---|
| 7,487,343 | B1 * | 2/2009 | Insley | ..................... | G06F 9/441 |
| | | | | | 713/1 |
| 9,043,776 | B2 | 5/2015 | Guo et al. | | |
| 9,304,782 | B2 * | 4/2016 | Tripathi | .................. | H04L 61/50 |
| 9,594,571 | B2 * | 3/2017 | Bibb, Jr. | ............... | G06F 21/572 |
| 9,880,859 | B2 * | 1/2018 | Swanson | ............... | G06F 9/4416 |
| 11,030,316 | B2 * | 6/2021 | Olarig | ................... | H04L 41/082 |
| 11,221,858 | B1 * | 1/2022 | Hormuth | ............... | G06F 9/4416 |
| 2013/0042098 | A1 * | 2/2013 | Baik | ...................... | G06F 9/445 |
| | | | | | 713/2 |
| 2014/0244989 | A1 * | 8/2014 | Hiltgen | ................. | G06F 9/4416 |
| | | | | | 713/2 |
| 2015/0355911 | A1 | 12/2015 | Bibb, Jr. et al. | | |

FOREIGN PATENT DOCUMENTS

| | | |
|---|---|---|
| CN | 110659035 A | 1/2020 |
| CN | 114416554 A | 4/2022 |
| CN | 115080069 A | 9/2022 |

OTHER PUBLICATIONS

1 Extended European Search Report for European Patent Application No. 23209908.5, dated Apr. 19, 2024, 8 pages.
Examination Report for EP Patent Application No. 25182185.6, dated Oct. 12, 2025, 6 pages.

* cited by examiner

*Primary Examiner* — Tammara R Peyton
(74) *Attorney, Agent, or Firm* — Dority & Manning, P.A.

(57) ABSTRACT

A baseboard management controller (BMC) communicatively coupled to a computing device receives, from a provisioning computing device, an unsolicited boot image. The BMC stores the boot image in a volatile memory. In response to receiving the boot image, the BMC causes the computing device to boot from the boot image.

20 Claims, 11 Drawing Sheets

START

RECEIVE, BY A BASEBOARD MANAGEMENT CONTROLLER (BMC) COMMUNICATIVELY COUPLED TO A COMPUTING DEVICE, FROM A PROVISIONING COMPUTING DEVICE, AN UNSOLICITED BOOT IMAGE — 1000

STORE, BY THE BMC, THE BOOT IMAGE IN A VOLATILE MEMORY — 1002

IN RESPONSE TO RECEIVING THE BOOT IMAGE, CAUSE, BY THE BMC, THE COMPUTING DEVICE TO BOOT FROM THE BOOT IMAGE — 1004

END

BMC — 12-1

BOOT IMAGE RECEIVER — 50

BOOT IMAGE STORER — 52

COMPUTING DEVICE REBOOTER — 54

START

DETERMINE, BY A PROVISIONING COMPUTING DEVICE, THAT A MANAGED COMPUTING DEVICE MANAGED BY A BASEBOARD MANAGEMENT CONTROLLER, IS TO BE PROVISIONED TO BOOT FROM A BOOT IMAGE ~2000

CAUSE, BY A PROVISIONING COMPUTING DEVICE, THE BOOT IMAGE TO BE DISTRIBUTED TO THE BASEBOARD MANAGEMENT CONTROLLER WITHOUT A REQUEST FROM THE BASEBOARD MANAGEMENT CONTROLLER ~2002

END

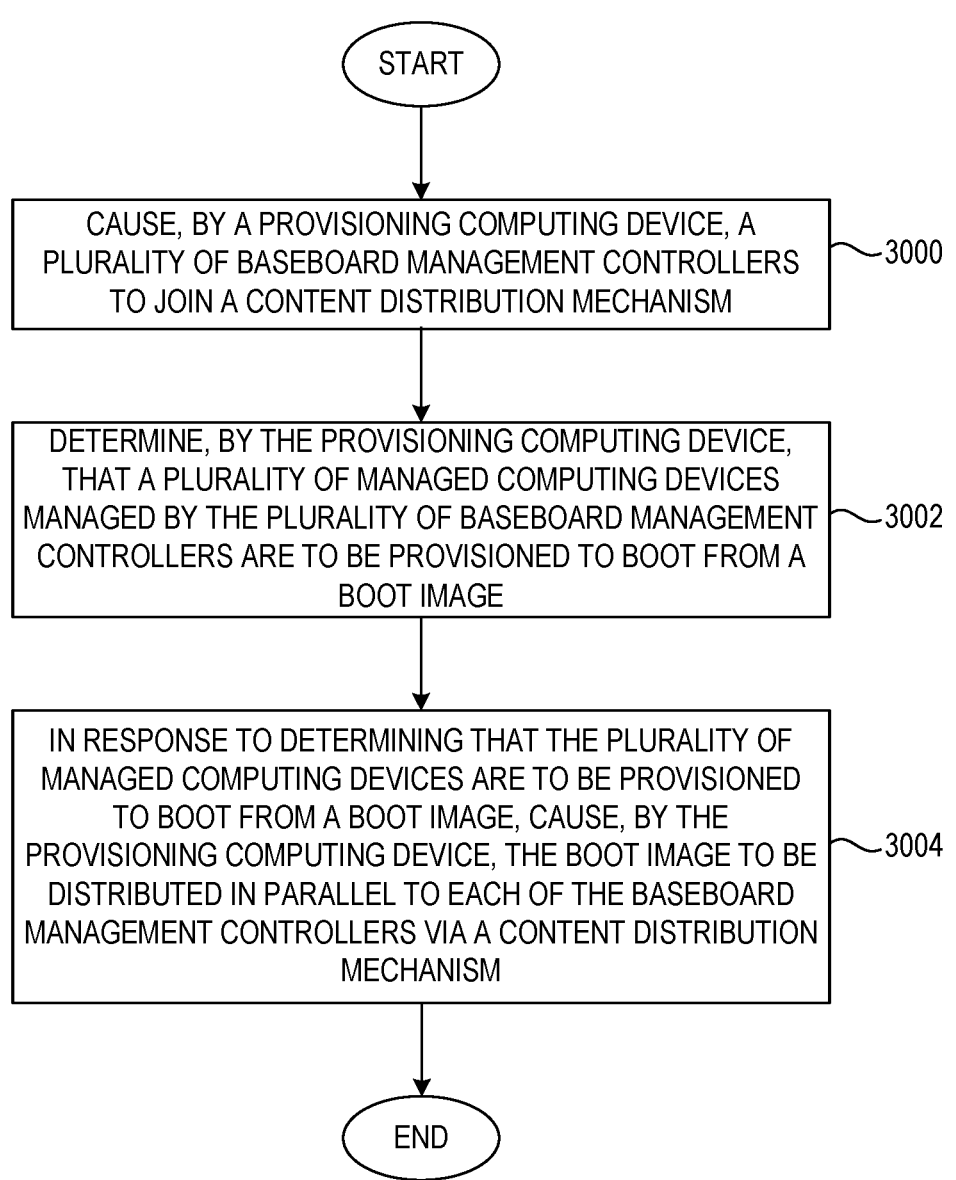

START

CAUSE, BY A PROVISIONING COMPUTING DEVICE, A PLURALITY OF BASEBOARD MANAGEMENT CONTROLLERS TO JOIN A CONTENT DISTRIBUTION MECHANISM — 3000

DETERMINE, BY THE PROVISIONING COMPUTING DEVICE, THAT A PLURALITY OF MANAGED COMPUTING DEVICES MANAGED BY THE PLURALITY OF BASEBOARD MANAGEMENT CONTROLLERS ARE TO BE PROVISIONED TO BOOT FROM A BOOT IMAGE — 3002

IN RESPONSE TO DETERMINING THAT THE PLURALITY OF MANAGED COMPUTING DEVICES ARE TO BE PROVISIONED TO BOOT FROM A BOOT IMAGE, CAUSE, BY THE PROVISIONING COMPUTING DEVICE, THE BOOT IMAGE TO BE DISTRIBUTED IN PARALLEL TO EACH OF THE BASEBOARD MANAGEMENT CONTROLLERS VIA A CONTENT DISTRIBUTION MECHANISM — 3004

END

*FIG. 9*

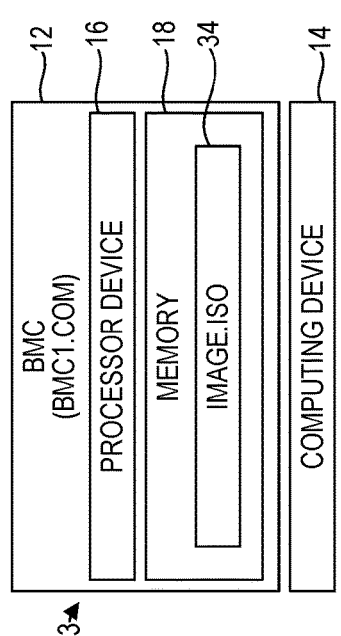
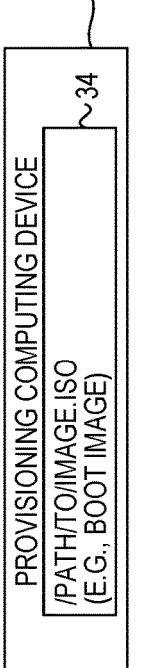
*FIG. 10*

AUTOMATED BOOT IMAGE CONFIGURATION AND BOOTING VIA A BASEBOARD MANAGEMENT CONTROLLER IN RESPONSE TO AN UNSOLICITED BOOT IMAGE

BACKGROUND

A baseboard management controller (BMC) is a specialized controller coupled to a computing device that can monitor, control and otherwise manage the computing device even when the computing device is powered off. A BMC can be used to facilitate provisioning of the computing device without the need for a human to be in physical contact with the computing device.

SUMMARY

The examples disclosed herein facilitate automated boot image configuration and booting via a BMC in response to an unsolicited boot image.

In one example a method is provided. The method includes receiving, by a baseboard management controller (BMC) communicatively coupled to a computing device, from a provisioning computing device, an unsolicited boot image. The method further includes storing, by the BMC, the boot image in a volatile memory. The method further includes, in response to receiving the boot image, causing, by the BMC, the computing device to boot from the boot image.

In another example a baseboard management controller is provided. The baseboard management controller includes circuitry operable to receive, from a provisioning computing device, an unsolicited boot image. The circuitry is further operable to store the boot image in a volatile memory. The circuitry is further operable to, in response to receiving the boot image, cause a computing device managed by the BMC to boot from the boot image.

In another example a non-transitory computer-readable storage medium is provided. The non-transitory computer-readable storage medium includes executable instructions to cause a baseboard management controller (BMC) to receive, from a provisioning computing device, an unsolicited boot image. The instructions further cause the BMC to store the boot image in a volatile memory. The instructions further cause the BMC to, in response to receiving the boot image, cause a computing device managed by the BMC to boot from the boot image.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 9 is a flowchart of a method for a provisioning computing device to implement automated boot image configuration and booting via a BMC in response to an unsolicited boot image according to additional examples;

FIG. 10 is a simplified block diagram of the environment illustrated in FIG. 1 according to one implementation.

DETAILED DESCRIPTION

Figure 1:
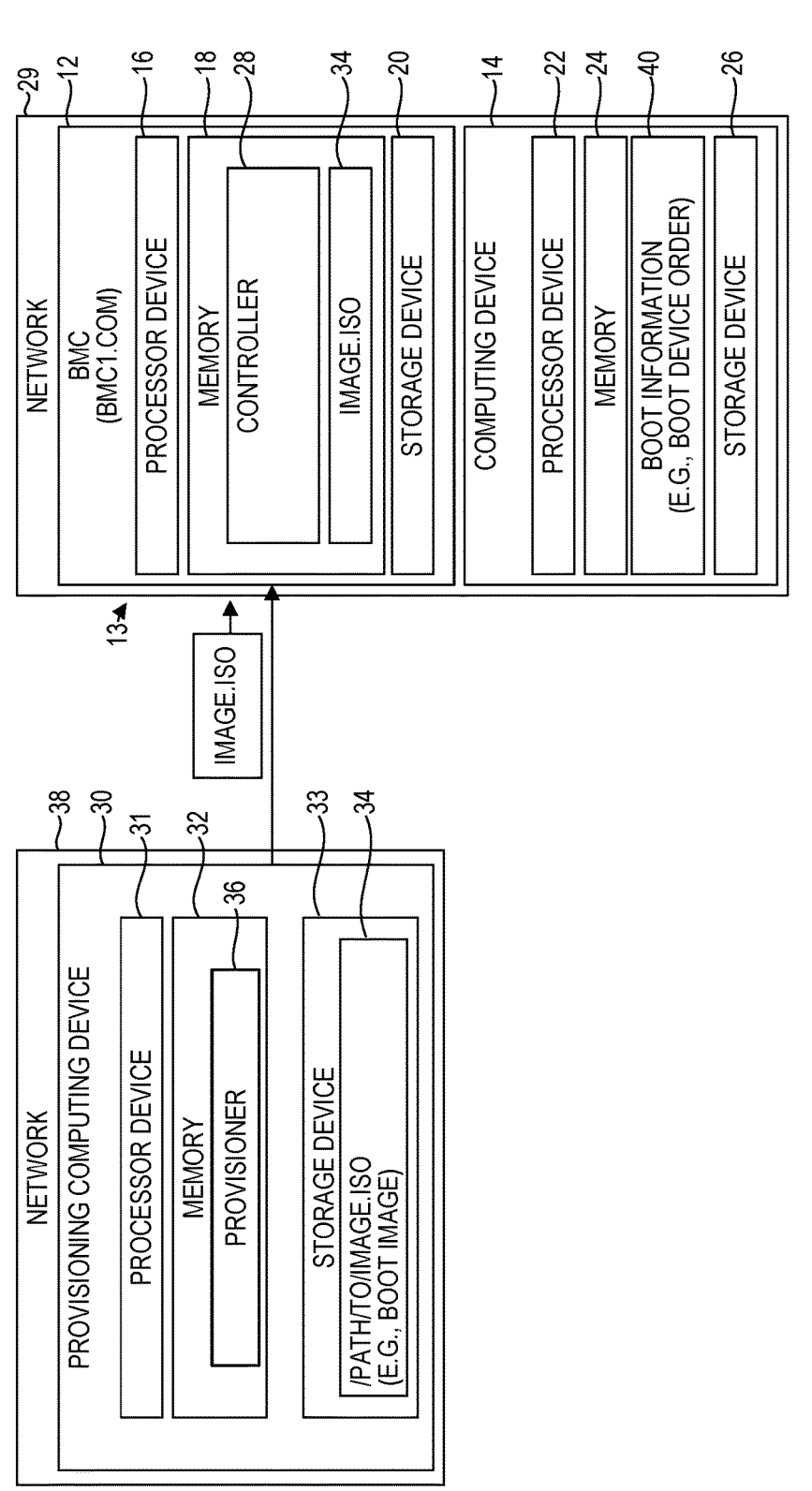
FIG. 1 is a block diagram of an environment suitable for implementing automated boot image configuration and booting via a baseboard management controller (BMC) in response to an unsolicited boot image according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A baseboard management controller (BMC) is a specialized controller coupled to a computing device that can monitor and control the computing device even when the computing device is powered off. A BMC can be used to facilitate provisioning of the computing device without the need for a human to be in physical contact with the computing device.

Typically, to utilize a BMC to cause a computing device to boot to a new boot image, the BMC is instructed to pull a boot image from a boot image source, such as a network storage device. A series of instructions are then sent to the BMC to cause the BMC to configure the computing device appropriately and to cause the BMC to cause the computing device to reboot from the boot image. Typically, the BMC is instructed to cause the boot image to be mounted to the computing device as a "virtual media." The BMC may then be instructed to cause the computing device to reboot to the boot image.

Unfortunately, different manufacturers of BMCs utilize different mechanisms to facilitate the use of virtual media for booting a computing device in this manner. For example, different BMC manufacturers utilize different types of virtual media drives for this purpose, such as a virtual media CD drive or a virtual media USB drive. Moreover, each BMC manufacturer may use a different drive name. In an environment that utilizes BMCs from different manufacturers, the operations staff must be aware of the particular BMC manufacturer of each BMC and send the appropriate commands utilizing the correct drive name. Failure to do so will result in the computing device not being able to boot into the boot image.

Another challenge is that many data center sites, for example highly secure data center sites, may have network policies in place that do not allow connections from devices connected to a dedicated BMC network segment to devices located on a different network segment, such as a dedicated storage network. These policies may prohibit a BMC on a dedicated BMC network from initiating a connection with a network storage device located in a dedicated storage network.

The examples disclosed herein facilitate automated boot image configuration and booting via a BMC in response to an unsolicited boot image. In particular, the BMC is communicatively coupled to a computing device. The BMC receives, from a provisioning computing device, an unsolicited boot image via a network. The BMC stores the boot image in a volatile memory, and, in response to receiving the boot image, causes the computing device managed by the BMC to boot from the boot image.

The examples eliminate a need for a BMC to open a connection with a device to pull a boot image because the boot image is pushed to the BMC rather than by from the BMC. Moreover, once the BMC receives the boot image, the BMC automatically, without a need for subsequent instructions from the provisioning computing device, configures the boot image in accordance with the proper requirements associated with that particular BMC to cause the computing device to successfully be able to boot from the boot image. Moreover, the BMC automatically causes the computing device to boot from the boot image without the need for the provisioning computing device to know a particular command associated with a particular BMC. The examples thus vastly simplify the automated provisioning of computing devices in a data center that utilizes BMCs from different manufacturers by allowing each computing device to be provisioned via an identical command that pushes a boot image to a BMC that is associated with the computing device and eliminates the need to know the particular sequence of actions and specialized commands that would otherwise be necessary to provision such computing devices.

FIG. 1 is a block diagram of an environment 10 suitable for implementing automated boot image configuration and booting via a BMC in response to an unsolicited boot image according to some examples. The environment 10 includes a BMC 12 that is communicatively coupled to a computing device 14. The BMC 12 includes circuitry 13, such as a processor device 16, memory 18, and in some implementations may have a storage device 20. The computing device 14 includes a processor device 22 that is separate from the processor device 16, a memory 24 that is separate from the memory 18, and a storage device 26 that is separate from the storage device 26. The BMC may include a controller 28 that implements aspects of the functionality described herein. The BMC 12 in some examples may be attached to the same motherboard as the processor device 22. The BMC 12 is operable to monitor and manage various aspects of the computing device 14, even when the processor device 22 is powered off or stops responding. The BMC 12 is capable of powering on or off the computing device 14 or causing the computing device 14 to restart. The BMC 12 and the computing device 14 may each have IP addresses associated with a first network 29.

The environment 10 also includes a provisioning computing device 30. The provisioning computing device 30 includes a processor device 31, a memory 32 and is communicatively coupled to a storage device 33 on which a boot image 34 is stored. The term "boot image" as used herein refers to an image that a computing device can boot from. The provisioning computing device 30 may include a provisioner 36 which may implement certain of the functionality described herein. The provisioning computing device 30 may have an IP address associated with a second network 38. The term "network" as used in this context refers to devices that have a same network address defined by a subnet mask.

While only one BMC 12 and associated computing device 14 are illustrated, in practice, the provisioning computing device 30 may routinely need to provision tens, hundreds or thousands of computing devices via associated BMCs. Conventionally, provisioning the computing device 14 would require a number of requests and instructions from the provisioning computing device 30 to the BMC 12. For example, the provisioning computing device 30 would send a query to the BMC 12 to determine the name of the virtual media device with which the boot image 34 would be associated. The provisioning computing device 30 would utilize the specific request syntax implemented by each BMC, which may differ from manufacturer to manufacturer. The provisioning computing device 30 would send an instruction to the BMC 12 to pull the boot image 34 from a storage device. Again, the provisioning computing device 30 would utilize the specific instruction syntax implemented by the BMC. The BMC would need privileges to be able to access the network storage device on which the boot image is stored. The provisioning computing device 30 would then send a request to the BMC to determine the boot device name for the virtual media device. The provisioning computing device 30 would send an instruction to the BMC 12 to configure the computing device 14 to boot from that boot device name instead of the current boot device. The provisioning computing device 30 would then send an instruction to the BMC 12 to cause the computing device 14 to boot from the newly configured image (once the desired boot image is configured, this is typically done by powering on or resetting the computing device 14). Each of these instructions may need to comply with the particular syntax of the BMC, and each may differ depending on the manufacturer of the BMC.

In the present examples, the provisioning computing device 30 and the BMC 12 are configured to rely on a push mechanism such that, when the provisioning computing device 30 pushes the boot image 34 to the BMC 12, the BMC 12 then implements a predetermined sequence of actions that causes the computing device 14 to boot from the boot image 34. The mechanics of setting up the associated computing device to boot from the boot image 34 is left to the manufacturer of the particular BMC. The provisioning computing device 30 need not be aware of virtual media device names (which may include, for example, virtual CD, DVD, USB or even floppy drives), boot device names (e.g., "Cd", "Dvd", "UsbCd"), or specific instruction/request syntaxes for each different manufacturer.

The particular push mechanism may be any suitable mechanism that allows one process, in this example the provisioning computing device 30, to "push" (e.g., cause to be transmitted) a file to another device, in this example, the BMC 12. In one implementation, the push mechanism may comprise a message queue or message bus.

As one example, the BMC 12 may be configured to, upon initialization or in response to an instruction or command, subscribe to a particular message queue. For example, the BMC 12 may implement an API endpoint that can be invoked by the provisioner 36 of the provisioning computing device 30 and, when invoked, subscribes to a particular message queue identified by the provisioner 36 in the invocation of the API endpoint.

At a subsequent point in time, the provisioner 36 determines that the computing device 14 should be provisioned to boot from the boot image 34. This determination may be made, for example, in response to operator input, or the provisioner 36 may programmatically determine that the computing device 14 is to boot from the boot image 34 based on some criterion or criteria. The provisioner 36 then sends, via the message queue, the boot image 34 to the BMC 12 without being requested to do so by the BMC 12 (i.e., the boot image 34 is pushed in an unsolicited manner). The controller 28, in response to receipt of the boot image 34, stores the boot image 34 in a memory, such as, by way of non-limiting example, the memory 18, the storage device 20, or another memory available to the BMC 12 and suitable for storage of the boot image 34.

The controller 28 mounts the virtual media device associated with the boot image 34 to the computing device 14. The controller 28 alters boot information 40 of the computing device 14 to boot from the boot image 34 in the memory 18 via the virtual media device. The controller 28 then causes the computing device 14 to boot from the boot image 34. For example, the BMC 12 may power on the computing device 14. If the computing device 14 is already powered on, the BMC 12 may cause the computing device 14 to restart. In some examples, the controller 28 may instruct the computing device 14 to boot from the boot image 34 a single time. For example, where the boot image 34 is an installer that includes software to install another boot image on the storage device 26, it is desirable that, after the installation, the computing device 14 subsequently boot from the storage device 26.

After the computing device 14 has successfully booted from the boot image 34, the boot image will remain connected until the next reboot (regardless of whether this reboot may be initiated by the BMC 12, the Installer, the Operator etc). The BMC 12 may discard the boot image 34 on subsequent reboot.

In this manner, the BMC 12 need not open a connection to another computing device, which may be prohibited in certain environments, and the provisioning computing device 30 need not be aware of the particular nuances of how the manufacturer of the BMC 12 implemented virtual media attachment.

It is noted that, because the provisioner 36 is a component of the provisioning computing device 30, functionality implemented by the provisioner 36 may be attributed to the provisioning computing device 30 generally. Moreover, in examples where the provisioner 36 comprises software instructions that program the processor device 31 to carry out functionality discussed herein, functionality implemented by the provisioner 36 may be attributed herein to the processor device 31.

Similarly, it is noted that, because the controller 28 is a component of the BMC 12, functionality implemented by the controller 28 may be attributed to the BMC 12 generally. Moreover, in examples where the controller 28 comprises software instructions that program the processor device 16 to carry out functionality discussed herein, functionality implemented by the controller 28 may be attributed herein to the processor device 16.

Figure 2:
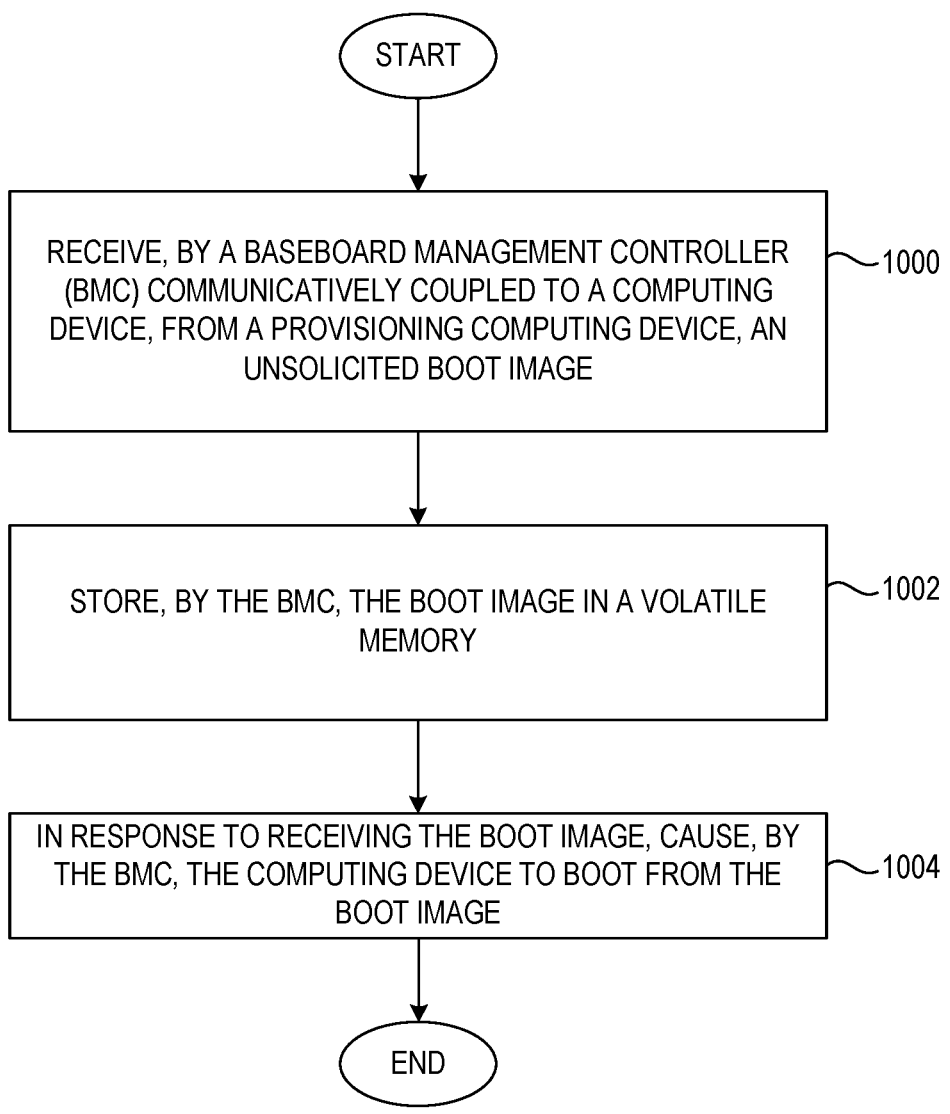
FIG. 2 is a flowchart of a method for automated boot image configuration and booting via a BMC in response to an unsolicited boot image according to one implementation.

FIG. 2 is a flowchart of a method for automated boot image configuration and booting via a BMC in response to an unsolicited boot image according to one implementation. FIG. 2 will be discussed in conjunction with FIG. 1. The BMC 12, communicatively coupled to the computing device 14, receives from the provisioning computing device 30 the unsolicited boot image 34 (FIG. 2, block 1000). The BMC 12 stores the boot 34 image in a volatile memory, such as the memory 18 (FIG. 2, block 1002). In response to receiving the boot image 34, the BMC 12 causes the computing device 14 to boot from the boot image 34 (FIG. 2, block 1004).

Figure 3:
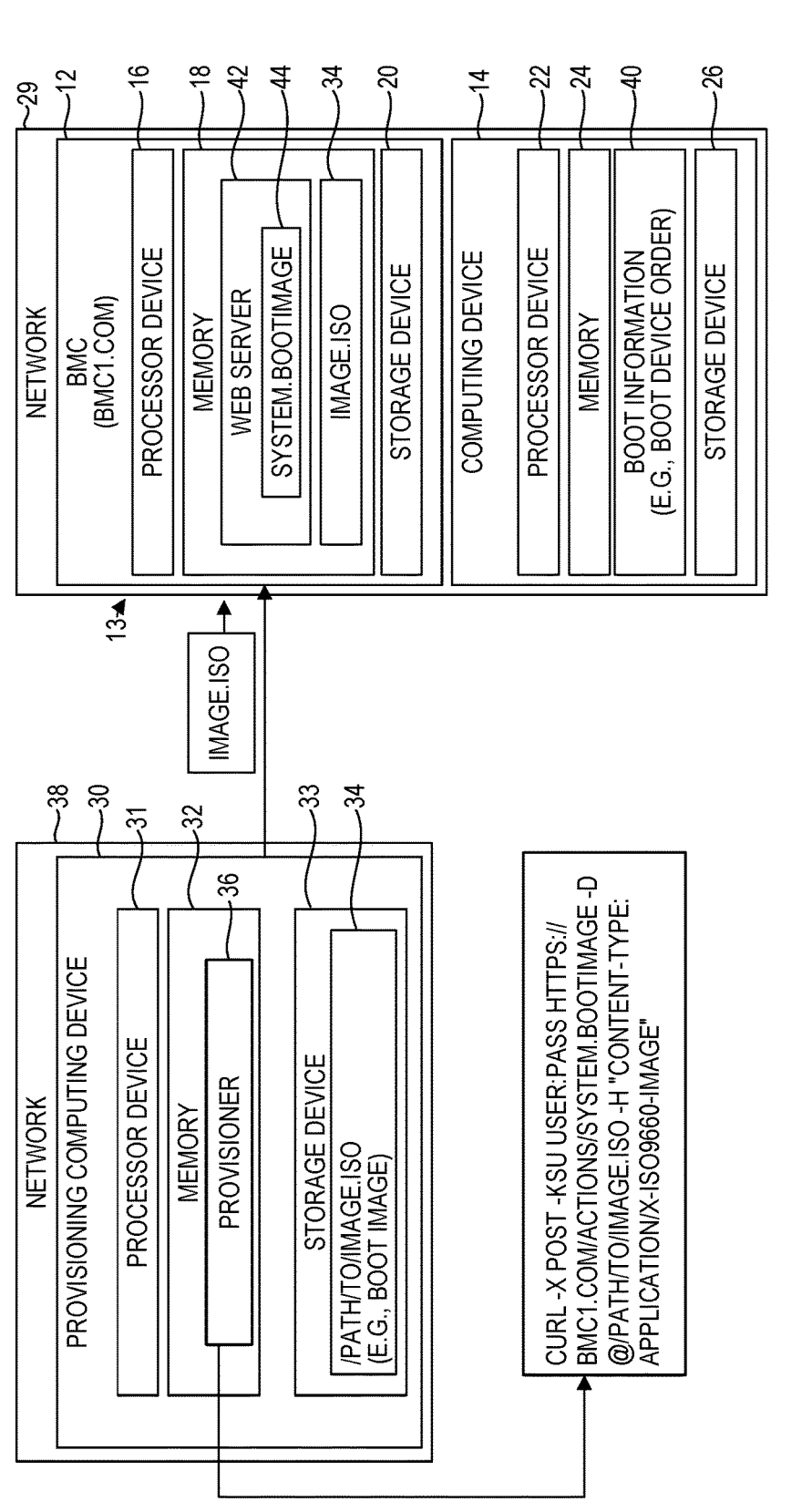
FIG. 3 is a block diagram of an environment suitable for implementing automated boot image configuration and booting via a BMC in response to an unsolicited boot image according to additional examples.

FIG. 3 is a block diagram of an environment 10-1 suitable for implementing automated boot image configuration and booting via a BMC in response to an unsolicited boot image according to additional examples. The environment 10-1 operates substantially similarly to the environment 10 except as otherwise discussed herein. In this example the BMC 12 includes a web server 42 that exposes an HTTP API endpoint 44 "SYSTEM.BOOTIMAGE" which, when invoked, causes the BMC 12 to implement certain functionality described herein in greater detail below.

In this example, each BMC implements the same HTTP API endpoint, such as the endpoint 44, and the mechanics of setting up the associated computing device to boot from the boot image is left to the manufacturer of the particular BMC. As an example, the provisioner 36 determines that the computing device 14 should be provisioned to boot from the boot image 34. Again, this determination may be made, for example, in response to operator input, or the provisioner 36 may programmatically determine that the computing device 14 is to boot from the boot image 34 based on some criterion or criteria. In this example, the provisioner 36 sends an HTTP POST instruction to the API endpoint 44, such as, by way of non-limiting example:

curl-X POST-ksu USER: PASS https://bmc1.com/Actions/System.BootImage-d　@/path/to/image.iso-H "Content-type: application/x-iso9660-image"

Curl is a command line tool available on many different operating systems. This instruction includes an HTTP POST operation that identifies the API endpoint 44, provides user credentials for the BMC 12, and identifies the location and type of the boot image 34. The HTTP POST command pushes the boot image 34 to the BMC 12 without being requested to do so by the BMC 12 (i.e., the boot image 34 is unsolicited from the perspective of the BMC 12). The BMC 12, in response to the invocation of the endpoint 44, stores the boot image 34 in a memory, such as the memory 18. In some examples, the BMC 12 may store the boot image 34 in the storage device 20 rather than the memory 18. The BMC 12 may respond to the provisioner 36 with an indication that the command was received and an identification of the location of the virtual device that will be mounted to the computing device 14, such as "SYSTEM/1/VIRTUAL-MEDIA/CD". The returned URL may be used to perform various management actions, including ejecting the device if desired.

The BMC 12 mounts the virtual media device associated with the boot image 34 to the computing device 14. The BMC 12 alters boot information 40 of the computing device 14 to boot from the boot image 34 in the memory 18 via the virtual media device. The BMC 12 then causes the computing device to boot from the boot image 34. For example, the BMC 12 may power on the computing device 14. If the computing device 14 is already powered on, the BMC 12 may cause the computing device 14 to restart. Again, in some examples, the controller 28 may instruct the computing device 14 to boot from the boot image 34 a single time. For example, where the boot image 34 is an installer that includes software to install another boot image on the storage device 26, it is desirable that, after the installation, the computing device 14 subsequently boot from the storage device 26. After the computing device 14 has successfully booted from the boot image 34, the BMC 12 may discard the boot image 34. The BMC 12 may wait to discard the boot image 34 until the computing device 14 has booted again from a boot image on the storage device 26 to ensure that the computing device 14 no longer needs the boot image 34.

Figure 4:
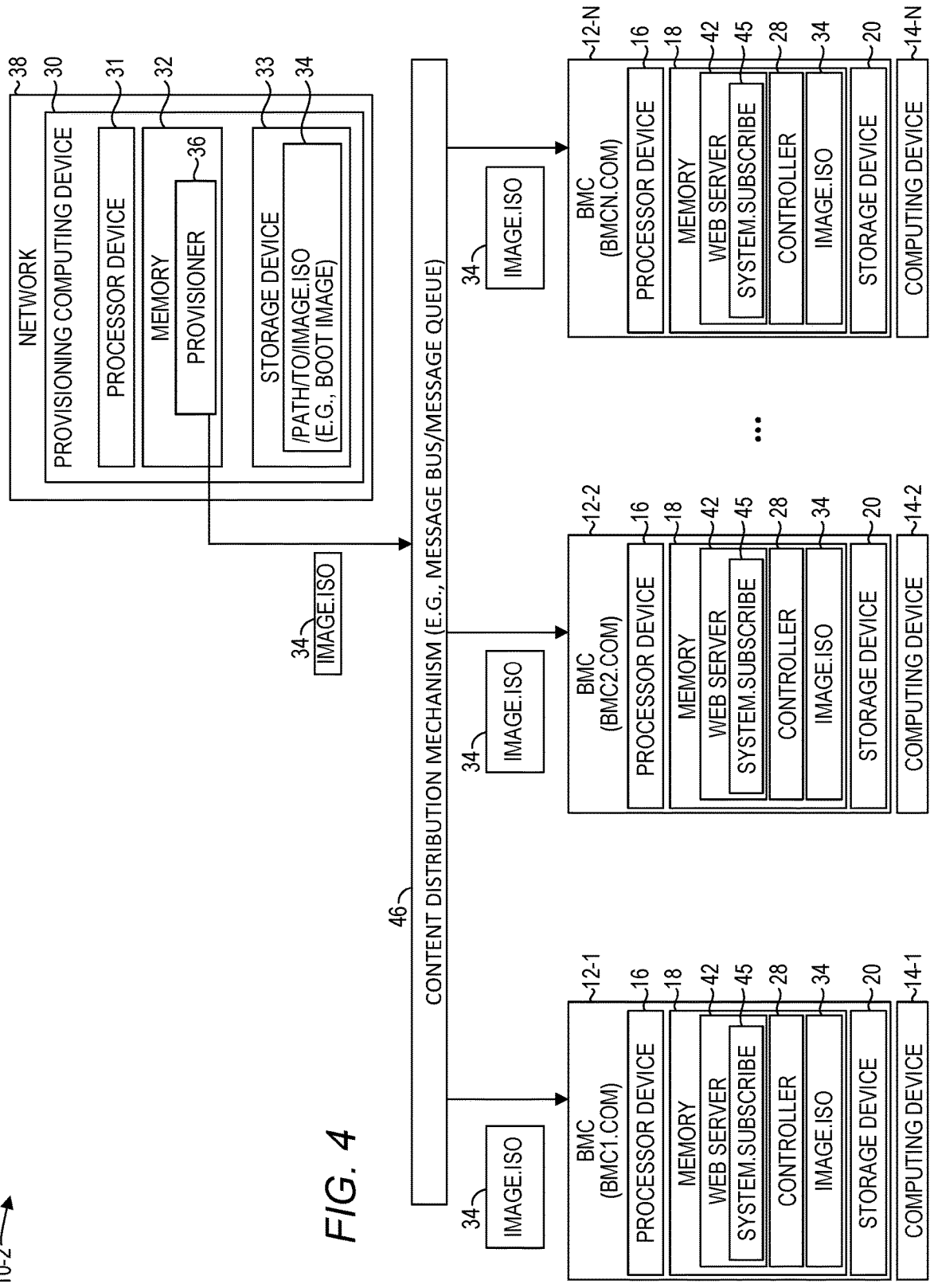
FIG. 4 is a block diagram of an environment suitable for implementing automated boot image configuration and booting via a BMC in response to an unsolicited boot image according to additional examples.

FIG. 4 is a block diagram of an environment 10-2 suitable for implementing automated boot image configuration and booting via a BMC in response to an unsolicited boot image according to additional examples. The environment 10-2 operates substantially similarly to the environment 10 except as otherwise discussed herein. In this example the environment 10-2 includes a plurality of BMCs 12-1-12-N, each of which is associated with a corresponding computing device 14-1-14-N, respectively. There may tens, hundreds, or thousands of BMCs 12-1-12-N and computing devices 14-1-14-N. The BMCs 12-1-12-N may each be in a separate network, groups of the BMCs 12-1-12-N may be in the same networks, or each of the BMCs 12-1-12-N may be in a single network.

The BMC 12-1 includes the web server 42, which, in this example, exposes an HTTP API endpoint 45 "SYSTEM. SUBSCRIBE" which, when invoked, causes the BMC 12-1 to join a message bus, message queue, or other suitable content distribution mechanism 46 via which a single transmission of data can be received by any number of receivers who have subscribed or otherwise joined the content distribution mechanism 46. The BMCs 12-2-12-N are configured substantially similarly to the BMC 12-1.

In this example, when the provisioner 36 learns about the BMC 12-1, such as via an operator command or otherwise, the provisioner 36 sends an HTTP instruction to the API endpoint 45 that identifies the particular content distribution mechanism 46. Upon being invoked, the API endpoint 45 (e.g., "SYSTEM. SUBSCRIBE") performs the actions suitable to join the content distribution mechanism 46. In a similar manner, the provisioner 36 invokes the API endpoints 45 of the BMCs 12-2-12-N which implement the same behavior as that of the BMC 12-1.

At a subsequent point in time, which could be seconds, minutes, hours or days, the provisioner 36 determines that the computing devices 14-1-14-N should be provisioned to boot from the boot image 34. Again, this determination may be made, for example, in response to operator input, or the provisioner 36 may programmatically determine that the computing devices 14-1-14-N are to boot from the boot image 34 based on some criterion or criteria. In this example, the provisioner 36 writes the boot image 34 to the content distribution mechanism 46.

Because the BMC 12-1 has joined the content distribution mechanism 46, the controller 28 detects that content has been sent to the content distribution mechanism 46. The content was not requested by the BMC 12-1 and was thus unsolicited. The BMC 12-1 receives the boot image 34 via the content distribution mechanism 46, and, in response to the boot image 34 being distributed to the BMC 12-1, stores the boot image 34 in a memory, such as the memory 18. In some examples, the BMC 12-1 may store the boot image 34 in the storage device 20 rather than the memory 18.

The BMC 12-1 mounts the virtual media device associated with the boot image 34 to the computing device 14-1. The BMC 12-1 alters boot information 40 of the computing device 14-1 to boot from the boot image 34 in the memory 18 via the virtual media device. The BMC 12-1 then causes the computing device 14-1 to boot from the boot image 34. For example, the BMC 12-1 may power on the computing device 14-1. If the computing device 14-1 is already powered on, the BMC 12-1 may cause the computing device 14-1 to restart. Again, in some examples, the controller 28 may instruct the computing device 14-1 to boot from the boot image 34 a single time. For example, where the boot image 34 is an installer that includes software to install another boot image on the storage device 26, it is desirable that, after the installation, the computing device 14-1 subsequently boot from the storage device 26. After the computing device 14-1 has successfully booted from the boot image 34, the BMC 12-1 may discard the boot image 34.

Each of the BMCs 12-2-12-N also receives the boot image 34 and operates substantially identically to the BMC 12-1. In this manner, multiple computing devices 14 can be provisioned with the boot image 34 via an unsolicited push of the boot image 34.

Figure 5:
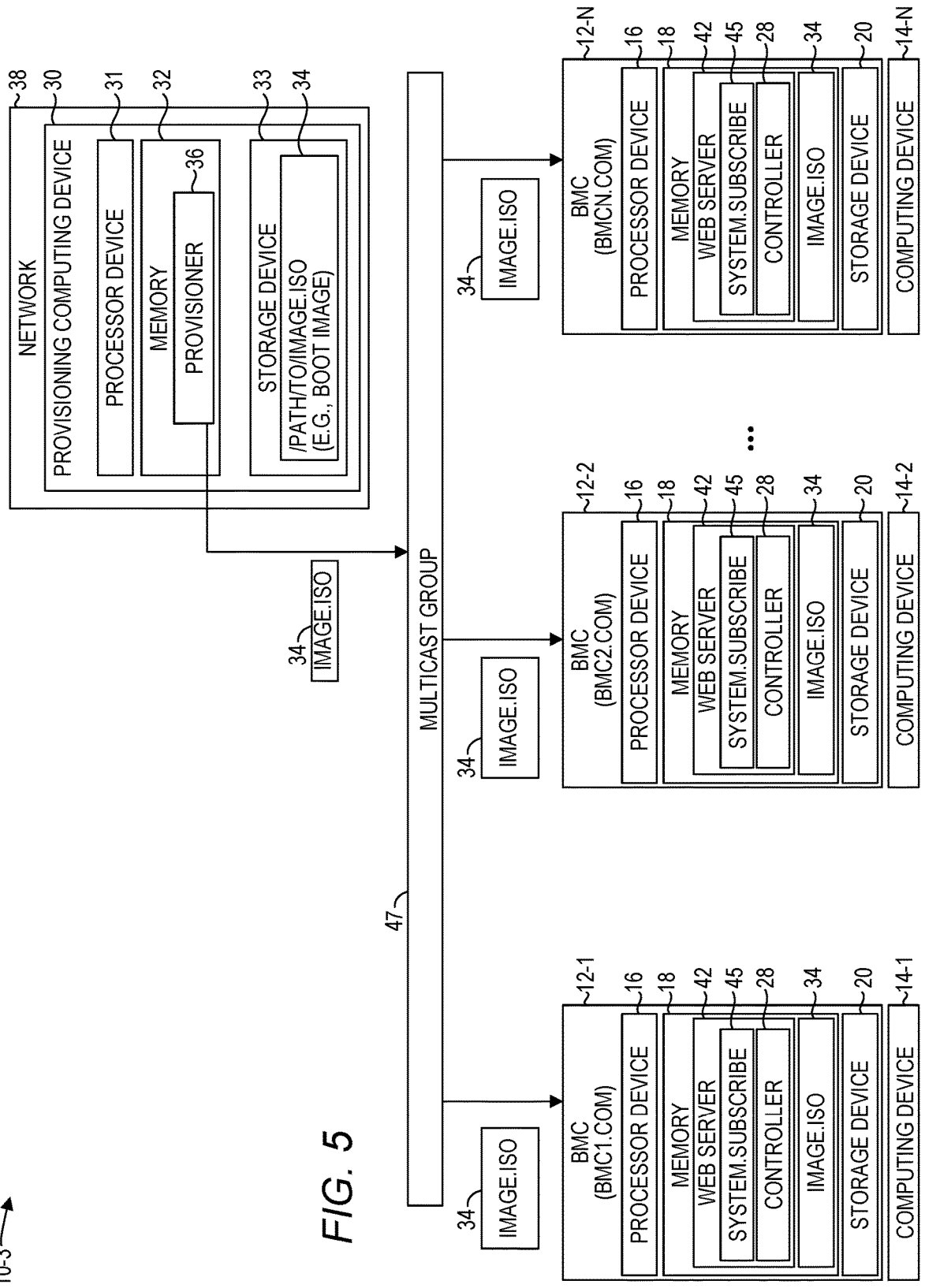
FIG. 5 is a block diagram of an environment suitable for implementing automated boot image configuration and booting via a BMC in response to an unsolicited boot image according to additional examples.

FIG. 5 is a block diagram of an environment 10-3 suitable for implementing automated boot image configuration and booting via a BMC in response to an unsolicited boot image according to additional examples. The environment 10-3 operates substantially similarly to the environments 10 and 10-2 except as otherwise discussed herein. In this example the environment 10-3 includes the plurality of BMCs 12-1-12-N, each of which is associated with the corresponding computing device 14-1-14-N, respectively. There may tens, hundreds, or thousands of BMCs 12-1-12-N and computing devices 14-1-14-N. The BMCs 12-1-12-N may each be in a separate network, groups of the BMCs 12-1-12-N may be in the same networks, of each of the BMCs 12-1-12-N may be in a single network.

The BMC 12-1 includes the web server 42, which, in this example, exposes the HTTP API endpoint 45 "SYSTEM. SUBSCRIBE" which, when invoked, causes the BMC 12-1 to join a content distribution mechanism such as a multicast group 47 via which a file can be multicasted to the plurality of BMCs 12-1-12-N. The BMCs 12-2-12-N are configured substantially similarly to the BMC 12-1.

In this example, when the provisioner 36 learns about the BMC 12-1, such as via an operator command or otherwise, the provisioner 36 sends an HTTP instruction to the API endpoint 45 that identifies the multicast group 47. Upon being invoked, the API endpoint 45 (e.g., "SYSTEM.SUB-SCRIBE") performs the actions suitable to join the multicast group 47. In a similar manner, the provisioner 36 invokes the API endpoints 45 of the BMCs 12-2-12-N which implement the same behavior as that of the BMC 12-1.

At a subsequent point in time, which could be seconds, minutes, hours or days, the provisioner 36 determines that the computing devices 14-1-14-N should be provisioned to boot from the boot image 34. Again, this determination may be made, for example, in response to operator input, or the provisioner 36 may programmatically determine that the computing devices 14-1-14-N are to boot from the boot image 34 based on some criterion or criteria. The provisioner 36 then writes the boot image 34 to the multicast group 47.

Because the BMC 12-1 has joined the multicast group 47, the controller 28 detects that content has been sent to the multicast group 47. The content was not requested by the BMC 12-1 and was thus unsolicited. The BMC 12-1 receives the boot image 34 via the multicast group 47, and, in response to the boot image 34 being distributed to the BMC 12-1, stores the boot image 34 in a memory, such as the memory 18. In some examples, the BMC 12-1 may store the boot image 34 in the storage device 20 rather than the memory 18.

The BMC 12-1 mounts the virtual media device associated with the boot image 34 to the computing device 14-1. The BMC 12-1 alters boot information 40 of the computing device 14-1 to boot from the boot image 34 in the memory 18 via the virtual media device. The BMC 12-1 then causes the computing device 14-1 to boot from the boot image 34. For example, the BMC 12-1 may power on the computing device 14-1. If the computing device 14-1 is already powered on, the BMC 12-1 may cause the computing device 14-1 to restart. Again, in some examples, the controller 28 may instruct the computing device 14-1 to boot from the boot image 34 a single time. For example, where the boot image 34 is an installer that includes software to install another boot image on the storage device 26, it is desirable that, after the installation, the computing device 14-1 subsequently boot from the storage device 26. After the computing device 14-1 has successfully booted from the boot image 34, the BMC 12-1 may discard the boot image 34.

Each of the BMCs 12-2-12-N also receive the boot image 34 via the multicast group 47 and operates substantially identically to the BMC 12-1. In this manner, multiple computing devices 14 can be provisioned with the boot image 34 via an unsolicited push of the boot image 34.

Figure 6:
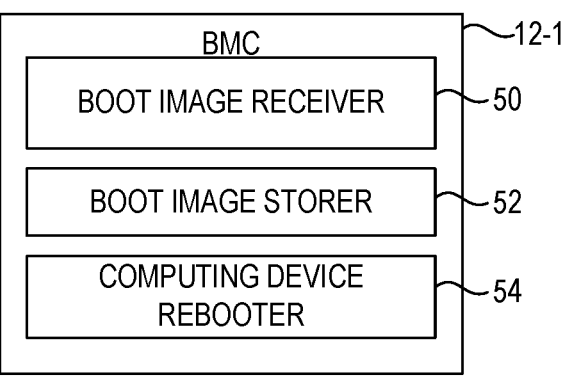
FIG. 6 is a block diagram of a BMC suitable for implementing one or more of the examples disclosed herein.

FIG. 6 is a block diagram of a BMC 12-1 according to another implementation. The BMC 12-1 implements identical functionality as that described above with regard to the BMC 12. The BMC 12-1 includes a boot image receiver 50 to receive, from the provisioning computing device 30, the unsolicited boot image 34. The boot image receiver 50 may comprise executable software instructions configured to program a processor device to implement the functionality of receiving, from the provisioning computing device 30, the unsolicited boot image 34, may comprise circuitry including, by way of non-limiting example, an application-specific integrated circuit (ASIC), field-programmable gate array (FPGA), or may comprise a combination of executable software instructions and circuitry.

The BMC 12-1 also includes a boot image storer 52 to store the boot image 34 in a volatile memory. The boot image storer 52 may comprise executable software instructions configured to program a processor device to implement the functionality of store the boot image 34 in the volatile memory, may comprise circuitry including, by way of non-limiting example, an ASIC, FPGA, or may comprise a combination of executable software instructions and circuitry.

The BMC 12-1 also includes a computing device rebooter 54 to cause, in response to receiving the boot image 34, a computing device managed by the BMC 12-1 to boot from the boot image 34. The computing device rebooter 54 may comprise executable software instructions to program a processor device to implement the functionality of causing, in response to receiving the boot image 34, a computing device managed by the BMC 12-1 to boot from the boot image 34, may comprise circuitry including, by way of non-limiting example, an ASIC, FPGA, or may comprise a combination of executable software instructions and circuitry.

Figure 7:
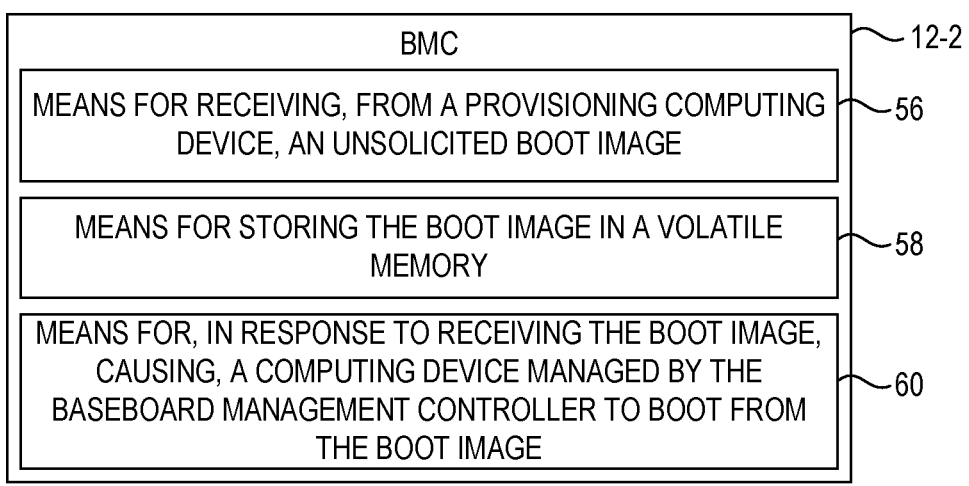
FIG. 7 is a block diagram of another BMC suitable for implementing the one or more of the examples disclosed herein.

FIG. 7 is a block diagram of a BMC 12-2 according to another implementation. The BMC 12-2 implements identical functionality as that described above with regard to the BMC 12. The BMC 12-2 includes a means 56 for receiving, from the provisioning computing device 30, the unsolicited boot image 34. The means 64 may be implemented in any number of manners, including, for example, via the boot image receiver 50 illustrated in FIG. 6. The means 56 may, in some implementations, comprise an API that may be invoked by the provisioning computing device 30, may comprise a pipes interface, or may comprise any other inter-process communication mechanism via which one process may send another process a file.

The BMC 12-2 also includes a means 58 for storing the boot image 34 in a volatile memory. The means 58 may be implemented in any number of manners, including, for example, via the boot image storer 52 illustrated in FIG. 6.

The BMC 12-2 also includes a means 60 for, in response to receiving the boot image 34, causing a computing device managed by the BMC 12-2 to boot from the boot image 34. The means 60 may be implemented in any number of manners, including, for example, via the computing device rebooter 54 illustrated in FIG. 6. In some examples, the means 60 may comprise sending a signal to a motherboard of the computing device that causes the motherboard to power on, or restart, the computing device.

Figure 8:
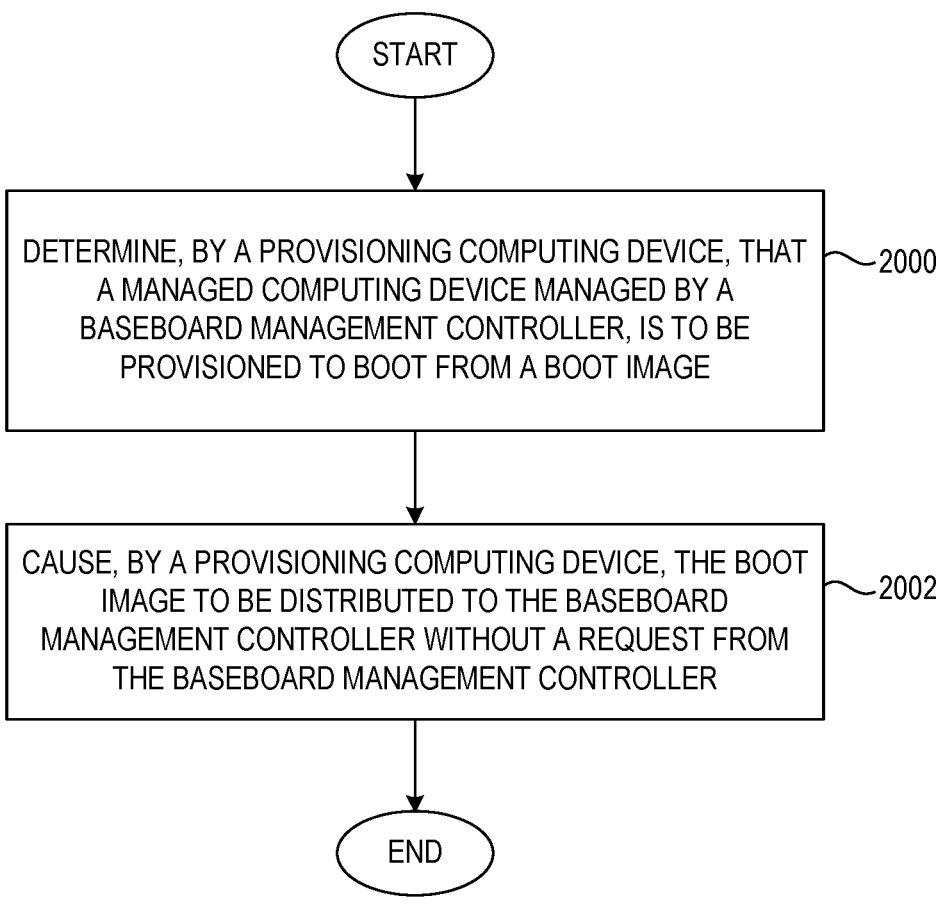
FIG. 8 is a flowchart of a method for a provisioning computing device to implement automated boot image configuration and booting via a BMC in response to an unsolicited boot image according to additional examples.

FIG. 8 is a flowchart of a method for a provisioning computing device to implement automated boot image configuration and booting via a BMC in response to an unsolicited boot image according to additional examples. FIG. 8 will be discussed in conjunction with FIG. 1. The provisioning computing device 30 determines that the managed computing device 14 managed by the BMC 12 is to be provisioned to boot from the boot image 34 (FIG. 8, block 2000). The provisioning computing device 30 causes the boot image 34 to be distributed to the BMC 12 without a request from the BMC 12 (FIG. 8, block 2002).

FIG. 9 is a flowchart of a method for a provisioning computing device to implement automated boot image configuration and booting via a BMC in response to an unsolicited boot image according to additional examples. FIG. 9 will be discussed in conjunction with FIG. 4. The provisioning computing device 30 causes the plurality of BMCs 12-1-12-N to join the content distribution mechanism 46 (FIG. 8, block 3000). The provisioning computing device 30 determines that the plurality of managed computing devices 14-1-14-N managed by the plurality of BMCs 12-1-12-N are to be provisioned to boot from the boot image 34 (FIG. 8, block 3002). The provisioning computing device 30, in response to determining that the plurality of managed computing devices 14-1-14-N are to be provisioned to boot from the boot image 34, causes the boot image 34 to be distributed in parallel to each of the BMCs 12-1-12-N via the content distribution mechanism 46 (FIG. 8, block 3004)

FIG. 10 is a simplified block diagram of the environment 10 illustrated in FIG. 1 according to one implementation. The environment 10 includes the BMC 12, which in turn includes the circuitry 13 such as the processor device 16 and the memory 18. The circuitry 13 is operable to receive, from the provisioning computing device 30, the unsolicited boot image 34. The circuitry 13 is further to store the boot image 34 in the volatile memory 18. The circuitry 13 is further to, in response to receiving the boot image 34, cause the computing device 14 managed by the BMC 12 to boot from the boot image 34.

Figure 11:
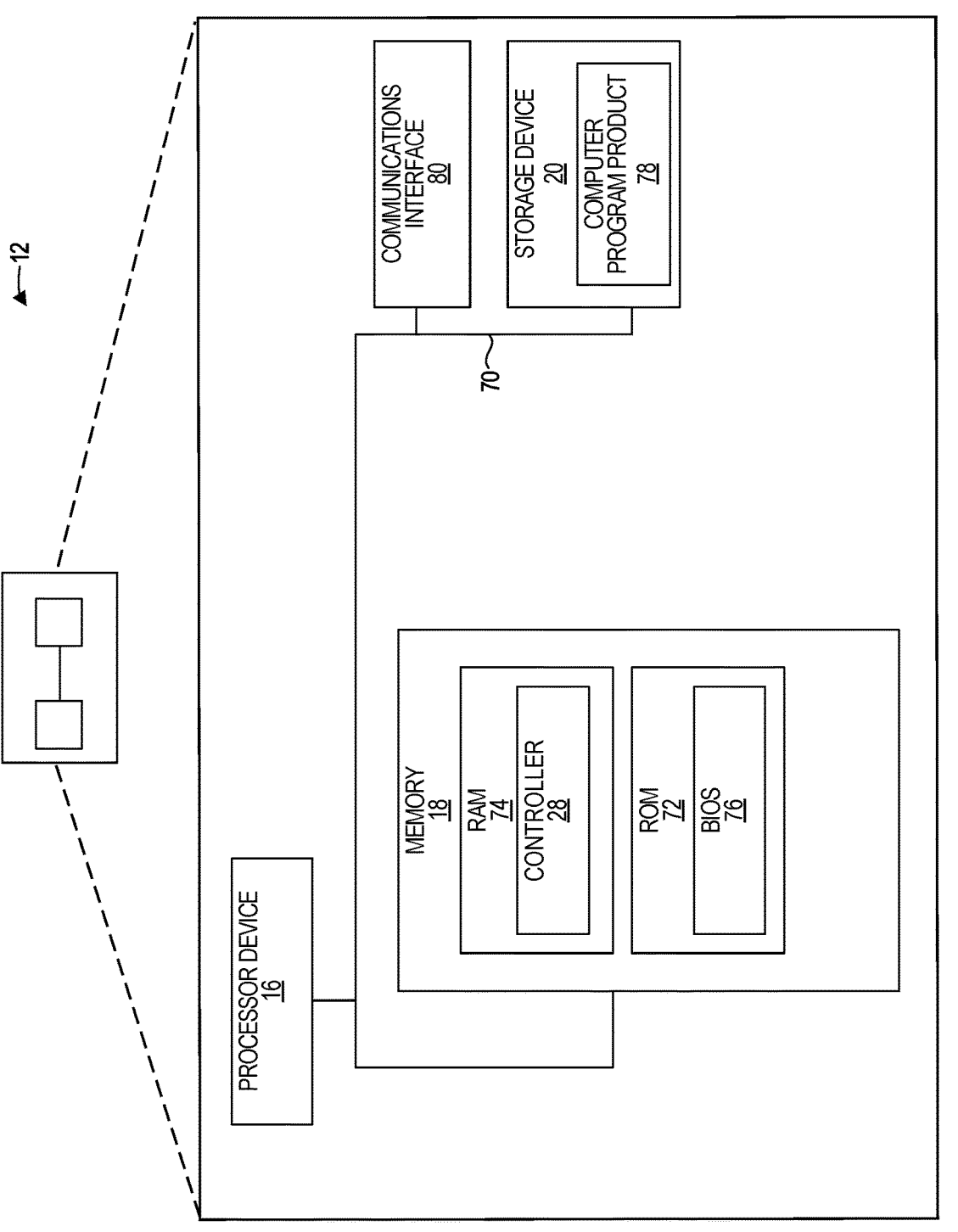
FIG. 11 is a block diagram of a BMC according to one implementation.

FIG. 11 is a block diagram of the BMC 12 according to one implementation. The BMC 12 includes the processor device 16, the system memory 18, and a system bus 70. The system bus 70 provides an interface for system components including, but not limited to, the system memory 18 and the processor device 16. The processor device 16 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The system memory 18 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the BMC 12. The volatile memory 74 may also include a high-speed RAM, such as static RAM, for caching data.

The BMC 12 may further include or be coupled to a non-transitory computer-readable storage medium such as the storage device 20, which may comprise, for example, solid state memory, or the like.

All or a portion of the examples may be implemented as a computer program product 78 stored on a non-transitory computer-usable or computer-readable storage medium, such as the storage device 20, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16.

The BMC 12 may also include a communications interface 80 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a baseboard management controller, comprising: a boot image receiver to receive, from a provisioning computing device, an unsolicited boot image via a network; a boot image storer to store the boot image in a volatile memory; and a computing device rebooter to cause, in response to receiving the boot image, a computing device managed by the baseboard management controller to boot from the boot image.

Example 2 is a baseboard management controller, comprising: means for receiving, from a provisioning computing device, an unsolicited boot image via a network; means for storing the boot image in a volatile memory; and means for, in response to receiving the boot image, causing, a computing device managed by the baseboard management controller to boot from the boot image.

Example 3 is a computing device, comprising: a memory; and a processor device coupled to the memory, the processor device to: determine that a managed computing device managed by a baseboard management controller, is to be provisioned to boot from a boot image; cause, by the processor device, the boot image to be distributed to the baseboard management controller without a request from the baseboard management controller.

Example 4 is the computing device of example 3, wherein the processor device is further to send the boot image to the baseboard management controller via a content distribution mechanism.

Example 5 is the computing device of example 3, wherein the processor device is further to send the boot image to the baseboard management controller by invoking an API endpoint of the baseboard management controller.

Example 6 is the computing device of example 5 wherein to invoke the API endpoint, the computing device sends an HTTP POST operation that identifies the boot image.

Example 7 is the computing device of example 6 wherein the HTTP POST operation provides authentication credentials associated with the baseboard management controller.

Example 8 is a method, comprising: determining, by a provisioning computing device, that a managed computing device managed by a baseboard management controller, is to be provisioned to boot from a boot image; and causing, by a provisioning computing device, the boot image to be distributed to the baseboard management controller without a request from the baseboard management controller.

Example 9 is the method of example 8, further comprising sending the boot image to the baseboard management controller via a content distribution mechanism.

Example 10 is the method of example 8, further comprising sending the boot image to the baseboard management controller by invoking an API endpoint of the baseboard management controller.

Example 11 is a computing device, comprising: a memory; and a processor device coupled to the memory, the processor device to: cause a plurality of baseboard management controllers to join a content distribution mechanism; determine that a plurality of managed computing devices managed by the plurality of baseboard management controllers are to be provisioned to boot from a boot image; and, in response to determining that the plurality of managed computing devices are to be provisioned to boot from a boot image, cause, by the processor device, the boot image to be distributed in parallel to each of the baseboard management controllers via a content distribution mechanism.

Example 12 is the computing device of example 11 wherein the content distribution mechanism comprises a message bus or a message queue.

Example 13 is the computing device of example 11 wherein the content distribution mechanism comprises a multicast group.

Example 14 is a method, comprising: causing, by a provisioning computing device, a plurality of baseboard management controllers to join a content distribution mechanism; determining, by the provisioning computing device, that a plurality of managed computing devices managed by the plurality of baseboard management controllers are to be provisioned to boot from a boot image; and, in response to determining that the plurality of managed computing devices are to be provisioned to boot from a boot image, causing, by the provisioning computing device, the boot image to be distributed in parallel to each of the baseboard management controllers via a content distribution mechanism.

Example 15 is the method of example 14 wherein the content distribution mechanism comprises a message bus or a message queue.

Example 16 is the method of example 14 wherein the content distribution mechanism comprises a multicast group.

Example 17 is a method, comprising: subscribing, by a baseboard management controller, to a message distribution mechanism; subsequently receiving, by the baseboard management controller via the message distribution mechanism, an unsolicited boot image; storing, by the baseboard management controller, the boot image in a volatile memory; and in response to receiving the boot image, causing, by the baseboard management controller, the computing device to boot from the boot image.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a baseboard management controller (BMC) communicatively coupled to a computing device, from a provisioning computing device, an unsolicited boot image via a push mechanism of the provisioning computing device, the unsolicited boot image being unsolicited from the perspective of the BMC;
storing, by the BMC, the unsolicited boot image in a volatile memory; and
in response to receiving the unsolicited boot image via the push mechanism, causing, by the BMC, the computing device to boot from the unsolicited boot image.

2. The method of claim 1 further comprising:
exposing, by the BMC, an HTTP API endpoint which, when invoked, receives the unsolicited boot image, stores the unsolicited boot image in the volatile memory and causes the computing device to boot from the unsolicited boot image.

3. The method of claim 1 further comprising:
modifying, by the BMC, a boot information of the computing device to cause the computing device to boot from the unsolicited boot image via a virtual device of the computing device.

4. The method of claim 3 further comprising:
subsequent to the computing device booting from the unsolicited boot image via a virtual device of the computing device, modifying, by the BMC, the boot information of the computing device to cause the computing device to boot via a default device that differs from the virtual device.

5. The method of claim 1 further comprising:
determining, by the BMC, that the computing device has rebooted from a different boot image other than the unsolicited boot image; and in response to determining that the computing device has rebooted from the different boot image, discarding, by the BMC, the unsolicited boot image.

6. The method of claim 1 further comprising:
sending, by the BMC to the provisioning computing device in response to the unsolicited boot image, a message indicating that the unsolicited boot image was successfully received.

7. The method of claim 1 further comprising:
associating, by the BMC, the unsolicited boot image with a virtual device of the computing device; and
sending, by the BMC to the provisioning computing device in response to receiving the unsolicited boot image via the push mechanism, a message providing a device identifier that identifies the virtual device.

8. The method of claim 1 further comprising:
exposing, by the BMC, an HTTP API endpoint; and
wherein receiving the unsolicited boot image via the push mechanism comprises receiving the unsolicited boot image via an invocation of the HTTP API endpoint by the provisioning computing device.

9. The method of claim 8 wherein the invocation of the HTTP API endpoint comprises an HTTP POST operation and the unsolicited boot image is identified in the invocation.

10. The method of claim 1 wherein the computing device comprises a processor device attached to a motherboard, and wherein the BMC comprises circuitry attached to the motherboard.

11. The method of claim 1 wherein the BMC mounts the unsolicited boot image as a virtual media device to the computing device and alters boot information of the computing device to boot from the virtual media device.

12. The method of claim 1 further comprising:
causing, by the BMC, the computing device to boot from the unsolicited boot image by powering on, by the BMC, the computing device.

13. The method of claim 1 further comprising:
causing, by the BMC, the computing device to boot from the unsolicited boot image by restarting, by the BMC, the computing device.

14. The method of claim 1 further comprising:
receiving, by the BMC from the provisioning computing device, a request to join a content distribution mechanism;
in response to the request, joining the content distribution mechanism; and
wherein receiving the unsolicited boot image via the push mechanism comprises receiving the unsolicited boot image via the content distribution mechanism.

15. The method of claim 14 wherein the content distribution mechanism comprises a multicast group.

16. The method of claim 14 wherein the content distribution mechanism comprises a message bus.

17. A baseboard management controller (BMC), comprising:
circuitry operable to:
receive, from a provisioning computing device, an unsolicited boot image via a push mechanism of the provisioning computing device, the unsolicited boot image being unsolicited from a perspective of the BMC;
store the unsolicited boot image in a volatile memory; and
in response to receiving the unsolicited boot image via the push mechanism, cause a computing device managed by the BMC to boot from the unsolicited boot image.

18. The baseboard management controller of claim 17 wherein the circuitry is further operable to expose an HTTP API endpoint which, when invoked, receives the unsolicited boot image, stores the unsolicited boot image in the volatile memory and causes the computing device to boot from the unsolicited boot image.

19. The baseboard management controller of claim 17 wherein the circuitry is further operable to modify a boot information of the computing device to cause the computing device to boot from the unsolicited boot image via a virtual device of the computing device.

20. A non-transitory computer-readable storage medium that includes executable instructions to cause a baseboard management controller (BMC) to:

receive, from a provisioning computing device, an unsolicited boot image via a push mechanism of the provisioning computing device, the unsolicited boot image being unsolicited from a perspective of the BMC;

store the unsolicited boot image in a volatile memory; and in response to receiving the unsolicited boot image via the push mechanism, cause a computing device managed by the BMC to boot from the unsolicited boot image.

* * * * *